(12) United States Patent
Miki et al.

(10) Patent No.: US 11,656,821 B2
(45) Date of Patent: May 23, 2023

(54) IMAGE FORMING APPARATUS AND NON-TRANSITORY COMPUTER READABLE MEDIUM

(71) Applicant: FUJIFILM BUSINESS INNOVATION CORP., Tokyo (JP)

(72) Inventors: Masayoshi Miki, Kanagawa (JP); Teiju Sato, Kanagawa (JP); Masato Saito, Kanagawa (JP); Yasuhiro Nakatani, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 432 days.

(21) Appl. No.: 16/854,431

(22) Filed: Apr. 21, 2020

(65) Prior Publication Data
US 2021/0124538 A1    Apr. 29, 2021

(30) Foreign Application Priority Data
Oct. 29, 2019    (JP) .............................. JP2019-196299

(51) Int. Cl.
*G06F 3/12* (2006.01)
(52) U.S. Cl.
CPC .......... *G06F 3/1259* (2013.01); *G06F 3/1207* (2013.01); *G06F 3/1221* (2013.01); *G06F 3/1229* (2013.01)

(58) Field of Classification Search
None
See application file for complete search history.

(56) References Cited

U.S. PATENT DOCUMENTS

2015/0373217 A1 * 12/2015 Dombrowski ..... H04N 1/00631
358/498
2019/0208069 A1 * 7/2019 Hwang .............. H04N 1/00771

FOREIGN PATENT DOCUMENTS

| JP | 2006-1085 A | 1/2006 |
| JP | 2010-69660 A | 4/2010 |

* cited by examiner

*Primary Examiner* — Lennin R Rodriguezgonzalez
(74) *Attorney, Agent, or Firm* — Oliff PLC

(57) ABSTRACT

An image forming apparatus includes an image forming unit, an output unit, a light source, and a processor. The image forming unit creates a printed material by forming an image on paper. The output unit outputs the printed material to an output tray. The light source is provided such that lit light is viewable from outside the image forming apparatus. The processor is configured to receive specification of a period during which the light source is not to be lit, receive an instruction to create the printed material, and perform control such that in a case where the printed material is output in accordance with the instruction at a time outside the period, the light source is lit, whereas in a case where the printed material is output during the period, the light source is not lit during the period and then starts to be lit when the period ends.

20 Claims, 10 Drawing Sheets

| TURN-OFF TIMING | FORCED TURN-OFF START TIME | FORCED TURN-OFF END TIME |
|---|---|---|
| WHEN TURN-OFF BUTTON IS OPERATED | 19:00 | 06:00 |

IMAGE FORMING APPARATUS AND NON-TRANSITORY COMPUTER READABLE MEDIUM

CROSS-REFERENCE TO RELATED APPLICATIONS

This application is based on and claims priority under 35 USC 119 from Japanese Patent Application No. 2019-196299 filed Oct. 29, 2019.

BACKGROUND

(i) Technical Field

The present disclosure relates to an image forming apparatus and a non-transitory computer readable medium.

(ii) Related Art

Recently, a printer that notifies, by turning on light, a user that a printed material has been output has been suggested (for example, Japanese Unexamined Patent Application Publication No. 2006-1085).

A printer described in Japanese Unexamined Patent Application Publication No. 2006-1085 includes a plurality of paper output trays for different colors, sign poles that emit light of colors corresponding to the paper output trays, and a controller that causes a sign pole to emit light of a color corresponding to a paper output tray to which a printed material has been output.

SUMMARY

For example, in a case where a facsimile is received at midnight and a printed material is output, a user may not be present. Thus, causing a light source to be lit so that the user may be notified that the printed material has been output is not very necessary. However, it may be desirable that the next morning the light source be lit so that the user may be notified that the printed material has been output.

Aspects of non-limiting embodiments of the present disclosure relate to providing an image forming apparatus and a non-transitory computer readable medium that do not notify that a printed material has been output during a specific period but do notify that the printed material has been output after the period ends.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an image forming apparatus including an image forming unit, an output unit, a light source, and a processor. The image forming unit creates a printed material by forming an image on paper. The output unit outputs the printed material to an output tray. The light source is provided such that lit light is viewable from outside the image forming apparatus. The processor is configured to receive specification of a period during which the light source is not to be lit, receive an instruction to create the printed material, and perform control such that in a case where the printed material is output in accordance with the instruction at a time outside the period, the light source is lit, whereas in a case where the printed material is output during the period, the light source is not lit during the period and then starts to be lit when the period ends.

BRIEF DESCRIPTION OF THE DRAWINGS

Exemplary embodiments of the present disclosure will be described in detail based on the following figures, wherein.

DETAILED DESCRIPTION

Figure 1:
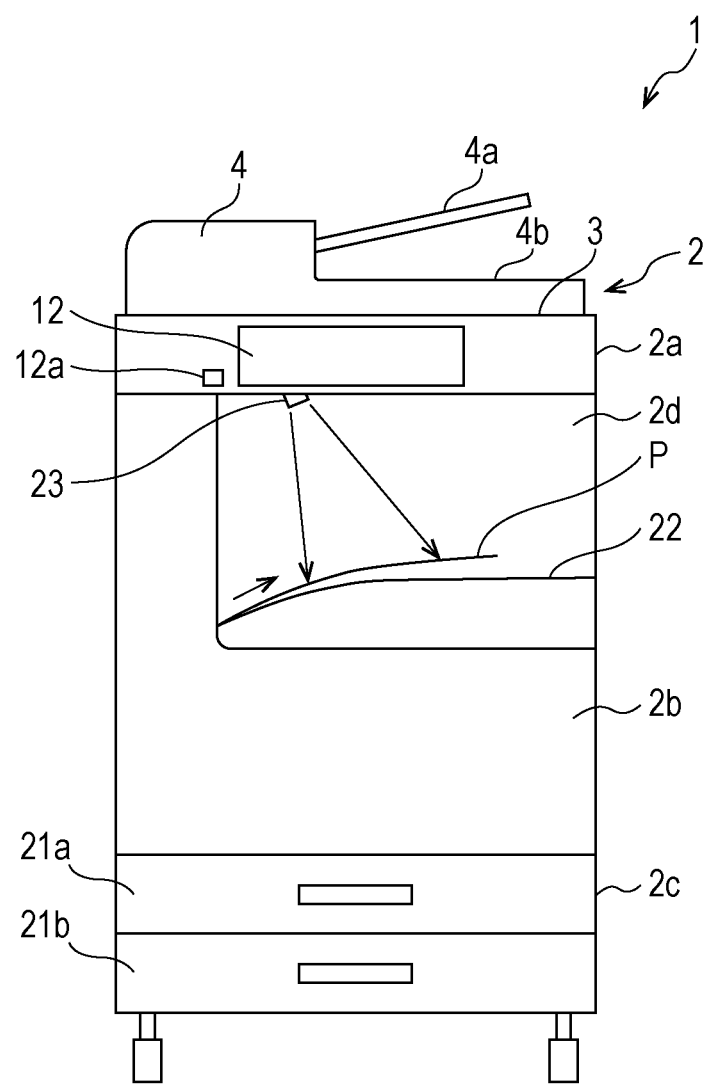
FIG. 1 is an external view illustrating a schematic configuration example of an image forming apparatus according to a first exemplary embodiment of the present disclosure.

Exemplary embodiments of the present disclosure will be explained below with reference to drawings. In the drawings, components having substantially the same functions will be referred to with the same signs, and redundant explanation will be omitted.

Summary of Exemplary Embodiments

An image forming apparatus according to an exemplary embodiment includes an image forming unit that creates a printed material by forming an image on paper, an output unit that outputs the printed material to an output tray, a light source that is provided such that lit light is viewable from outside the image forming apparatus, and a processor. The processor is configured to receive specification of a period during which the light source is not to be lit, receive an instruction to create the printed material, and perform control such that in a case where the printed material is output in accordance with the instruction at a time outside the period, the light source is lit, whereas in a case where the printed material is output during the period, the light source is not lit during the period and then starts to be lit when the period ends.

The period during which the light source is not lit is a period during which notifying that a printed material has been output is less necessary than other periods. The period during which the light source is not lit is, for example, nighttime. The period during which the light source is not lit may be set by a user in a desired manner.

In the case where the printed material is output during the period and an operation indicating that the printed material has been picked up from a tray is then performed, the processor may not perform control for starting to cause the light source to be lit when the period ends.

The operation indicating that a printed material has been picked up may be, for example:

(i) operation for indirectly issuing an instruction to turn off the light source; and (ii) operation for issuing an instruction to turn off the light source after the printed material has been picked up.

For example, an operation by a user for picking up a printed material from an output tray corresponds to the operation (i). The operation for picking up the printed material may be detected, for example, by a paper sensor that detects presence or absence of a printed material output to the output tray. Alternatively, for example, a human sensor or a load sensor arranged on the floor may detect that the user has approached the image forming apparatus to pick up the printed material from the output tray and then moved away from the image forming apparatus.

For example, an operation on a turn-off button, a specific gesture, or the like may correspond to the operation (ii). A user may be guided in advance in a user's manual or the like to turn off the light source by an operation on the turn-off button or the like after picking up all the printed materials from the output tray.

First Exemplary Embodiment

FIG. 1 is an external view illustrating a schematic configuration example of an image forming apparatus according to a first exemplary embodiment of the present disclosure. An image forming apparatus 1 is, for example, a multifunction apparatus including multiple functions such as a scanning function, a printing function, a copying function, an e-mail function, and a facsimile function. The image forming apparatus 1 may be an image forming apparatus including a single function such as a printing function or a facsimile function.

Furthermore, the image forming apparatus 1 includes a function for setting a forced turn-off period, in addition to the functions mentioned above. The forced turn-off period is an example of a period during which a light source is not to be lit.

The image forming apparatus 1 includes an apparatus body 2. The apparatus body 2 includes, in an upper part 2a, a platen 3 on which a document is placed and an automatic paper feeder 4 that automatically feeds a document to the platen 3. The automatic paper feeder 4 is provided so as to be openable in the upper part 2a of the apparatus body 2 and includes a document feeder tray 4a from which a document is fed and a document output tray 4b to which a document is output.

Furthermore, the apparatus body 2 includes, on a front side of the upper part 2a, an operation display unit 12 and a turn-off button 12a. The apparatus body 2 includes, inside an intermediate part 2b, an image forming unit 14 that forms an image. The apparatus body 2 includes, in a lower part 2c, a plurality of paper feed cassettes 21a and 21b that feed paper. The apparatus body 2 includes, in a space 2d between the upper part 2a and the intermediate part 2b, a paper output tray 22 to which a printed material P is output. The apparatus body 2 includes, on a lower face of the upper part 2a, a lamp 23 that illuminates the paper output tray 22. In the first exemplary embodiment, a paper sensor that detects a printed material P output to the paper output tray 22 is not provided. The paper output tray 22 is an example of an output tray. The lamp 23 is an example of a light source.

The turn-off button 12a is a button for turning off the lamp 23 that is lit. The turn-off button 12a may be a hardware key or a software key. The turn-off button 12a may be displayed on a screen displayed by the operation display unit 12. An operation on the turn-off button 12a is an example of an operation indicating that a printed material has been picked up or an operation for issuing an instruction to turn off the light source.

(Configuration of Lamp)

The lamp 23 emits, for example, white light. The lamp 23 includes, for example, a blue light-emitting diode (LED) that emits blue light and a fluorescent substance that converts part of blue light emitted from the blue LED into yellow light. Part of blue light is converted into yellow light by the fluorescent substance and a mixture of the blue light and the yellow light is emitted as white light. The color of light emitted from the lamp 23 is not limited to white like. For example, light of other colors, such as blue light, red light, or green light, may be emitted from the lamp 23.

The lamp 23 is arranged to illuminate a certain range, for example, with a diameter of about 10 cm, of a printed material P output to the paper output tray 22. The lamp 23 may be provided on an upper face of the upper part 2a of the apparatus body 2 as long as visually recognized from outside the image forming apparatus 1. Furthermore, the lamp 23 may be provided at a position away from the apparatus body 2, for example, may be provided on the ceiling or suspended from the ceiling.

Figure 2:
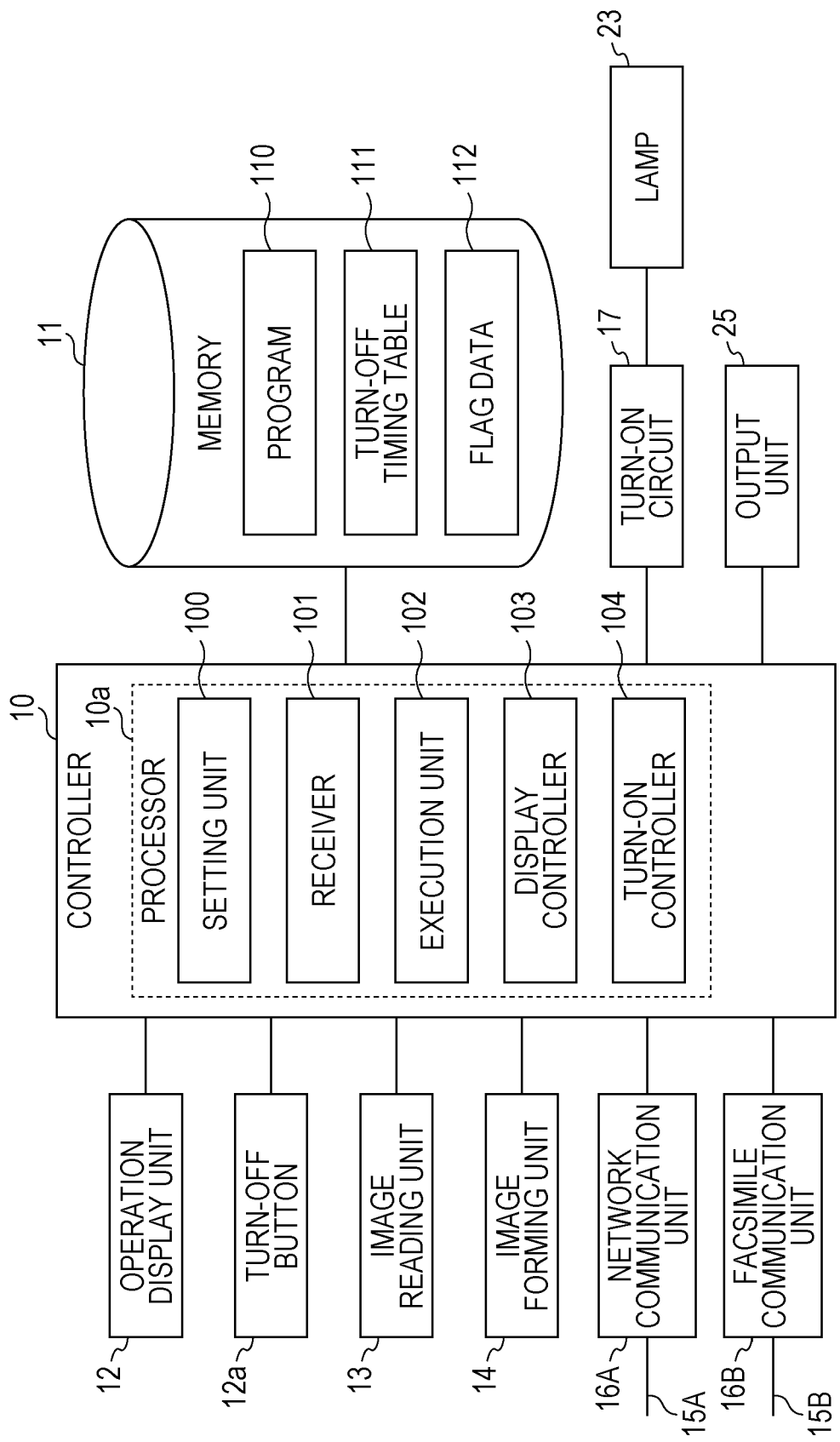
FIG. 2 is a block diagram illustrating an example of a control system of the image forming apparatus according to the first exemplary embodiment.

FIG. 2 is a block diagram illustrating an example of a control system of the image forming apparatus 1. The image forming apparatus 1 includes a controller 10 that controls units of the image forming apparatus 1. A memory 11, an operation display unit 12, the turn-off button 12a, an image reading unit 13, an image forming unit 14, a network communication unit 16A, a facsimile communication unit 16B, a turn-on circuit 17, and an output unit 25 are connected to the controller 10.

The controller 10 includes a processor 10a such as a central processing unit (CPU), an interface, and so on. The processor 10a functions as a receiver 101, an execution unit 102, a display controller 103, a turn-on controller 104, and so on when executing a program 110 stored in the memory 11. The details of a setting unit 100, the receiver 101, the execution unit 102, the display controller 103, and the turn-on controller 104 will be described later.

The memory 11 includes a read only memory (ROM), a random access memory (RAM), a hard disk, and so on and stores various types of information such as the program 110, a turn-off timing table 111 (see FIG. 3), and flag data 112. The flag data 112 is data of a flag indicating occurrence of a print job, that is, "0" indicating FALSE or "1" indicating TRUE. "0" is stored as an initial value for the flag data 112.

The operation display unit 12 inputs and displays information. The operation display unit 12 is, for example, a touch panel display and has a configuration in which a touch panel is superimposed on a display such as a liquid crystal display.

The image reading unit 13 includes the automatic paper feeder 4 provided on the platen 3 and a scanner (not illustrated in FIG. 1). The image reading unit 13 optically reads a document image from a document arranged on the platen 3 or a document transmitted by the automatic paper feeder 4.

The image forming unit 14 creates a printed material P by forming an image on paper fed from the paper feed cassette 21a or 21b using, for example, an electrophotographic system, an inkjet system, or the like.

A network 15A is a communication network such as, for example, a local area network (LAN) or the Internet.

The network communication unit 16A communicates with an external apparatus such as a user terminal via the network 15A in accordance with a communication protocol such as transmission control protocol/Internet protocol (TCP/IP). The network communication unit 16A receives a print job for printing and a print job for e-mail from the external apparatus.

The facsimile communication unit 16B modulates and demodulates data in accordance with a facsimile protocol such as G3 or G4 and communicates with an external apparatus such as a facsimile apparatus, an image forming apparatus, and the like via a public network 15B. The facsimile communication unit 16B receives a print job for facsimile from the external apparatus.

When a turn-on signal is transmitted from the controller 10, the turn-on circuit 17 turns on the lamp 23. When a turn-off signal is transmitted from the controller 10, the turn-on circuit 17 turns off the lamp 23.

The output unit 25 outputs a printed material P created by forming an image on paper by the image forming unit 14 under the control of the controller 10 to the paper output tray 22.

Figure 3:
FIG. 3 is a diagram illustrating an example of a turn-off timing table.
Figure 4A:
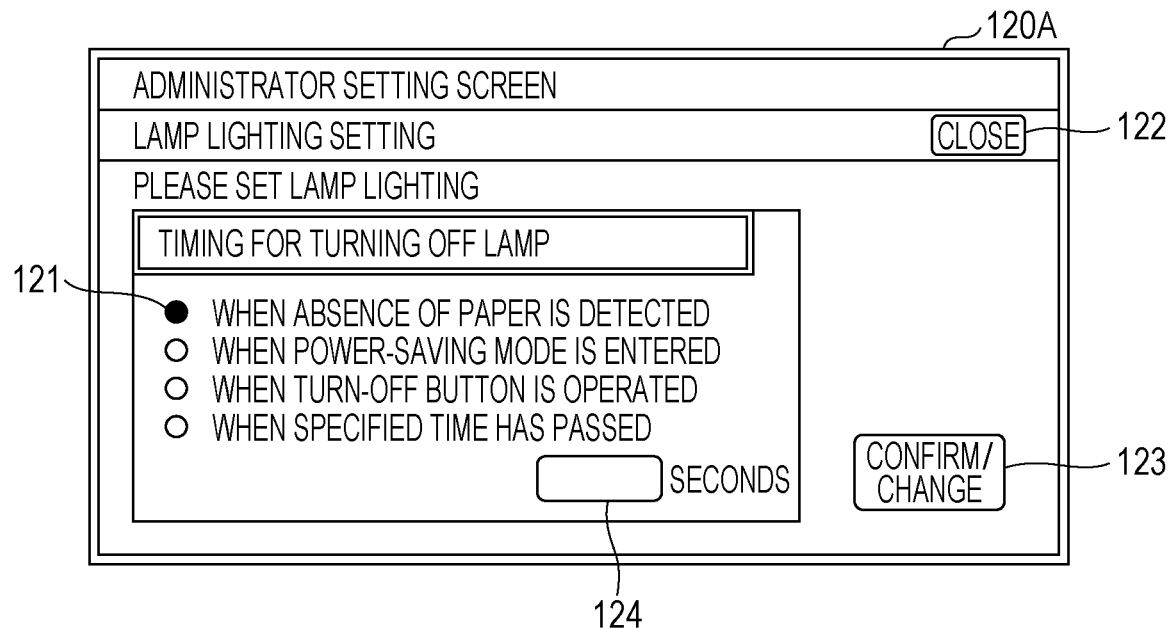
FIGS. 4A and 4B are diagrams illustrating examples of an administrator setting screen.
Figure 4B:
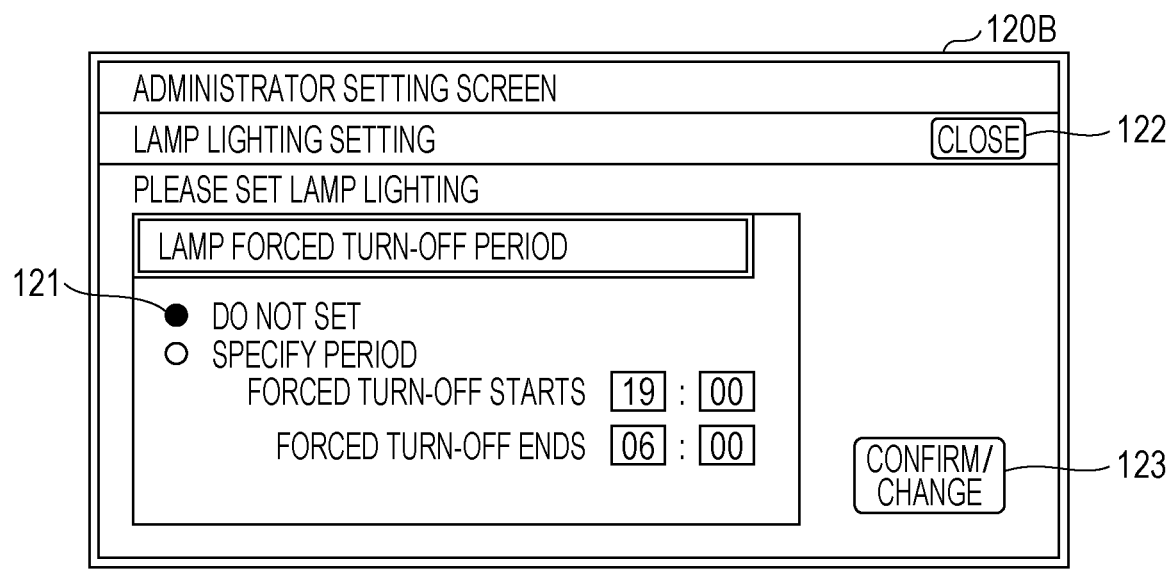

FIG. 3 is a diagram illustrating an example of the turn-off timing table 111. The turn-off timing table 111 includes items such as "turn-off timing", "forced turn-off start time", and "forced turn-off end time". As the item "turn-off timing", a turn-off timing selected on an administrator setting screen 120A in FIG. 4A, which will be described later, is recorded. In FIG. 4A, for example, "when turn-off button is operated" is recorded. As the item "forced turn-off start time", time at which the forced turn-off period starts (hereinafter, may be referred to as forced turn-off start time) that is input on an administrator setting screen 120B in FIG. 4B, which will be described later, is recorded. As the item "forced turn-off end time", time at which the forced turn-off period ends (hereinafter, may be referred to as forced turn-off end time) that is input on the administrator setting screen 120B in FIG. 4B is recorded. In FIG. 4B, for example, forced turn-off start time "19:00" and forced turn-off end time "06:00" are recorded.

Next, the components 100 to 104 of the controller 10 will be explained.

In accordance with operations by an administrator on the administrator setting screens 120A and 120B (see FIGS. 4A and 4B), the setting unit 100 records the turn-off timing of the lamp 23 as the item "turn-off timing" in the turn-off timing table 111, receives the forced turn-off start time and the forced turn-off end time as a period during which the lamp 23 is not to be lit, and records the forced turn-off start time and the forced turn-off end time as the "forced turn-off start time" and the "forced turn-off end time" in the turn-off timing table 111, respectively.

The receiver 101 receives a print job for printing or e-mail transmitted from an external apparatus via the network 15A and the network communication unit 16A or a print job for facsimile transmitted from an external apparatus via the public network 15B and the facsimile communication unit 16B as an instruction for creating a printed material.

The execution unit 102 controls the image forming unit 14 to execute a print job received by the receiver 101. At a time when executing the print job, the execution unit 102 stores "1", which represents that a flag indicating occurrence of a job represents TRUE, as the flag data 112 into the memory 11. At the time when a printed material P created by forming an image on paper by the image forming unit 14 is output to the paper output tray 22, the execution unit 102 transmits to the turn-on controller 104 an output signal indicating that the printed material P has been output. At the time when a forced turn-off period starts, as initialization processing, the execution unit 102 overwrites "0", which represents that a flag indicating occurrence of a job represents FALSE, as the flag data 112 into the memory 11.

The display controller 103 performs display control for various screens such as a menu screen and a setting screen on the operation display unit 12.

When an output signal is transmitted from the execution unit 102, the turn-on controller 104 transmits a turn-on signal to the turn-on circuit 17. When the turn-off button 12a is operated, the turn-on controller 104 transmits a turn-off signal to the turn-on circuit 17.

After transmitting the turn-on signal to the turn-on circuit 17, in the case where the turn-off button 12a is not operated and the forced turn-off period starts, the turn-on controller 104 transmits the turn-off signal to the turn-on circuit 17. Furthermore, after the forced turn-off period starts, even when the output signal is transmitted from the execution unit 102, the turn-on controller 104 does not transmit the turn-on signal to the turn-on circuit 17. When the forced turn-off period ends, the turn-on controller 104 transmits the turn-on signal to the turn-on circuit 17. That is, when the forced turn-off period ends, if the flag data 112 indicates "1", the turn-on controller 104 transmits the turn-on signal to the turn-on circuit 17. If the flag data 112 indicates "0", the turn-on controller 104 transmits the turn-off signal to the turn-on circuit 17.

(Operations of Image Forming Apparatus)

Next, examples of operations of the image forming apparatus 1 will be explained with reference to FIGS. 4A, 4B, 5A, 5B, 6, 7, 8, 9, 10A, and 10B.

(1) Setting Turn-Off Timing

FIGS. 4A and 4B are diagrams illustrating examples of an administrator setting screen displayed on the operation display unit 12.

When an administrator operates the operation display unit 12 to make a request to display an administrator setting screen, the display controller 103 displays the administrator setting screen 120A illustrated in FIG. 4A on the operation display unit 12. The administrator setting screen 120A allows selection of a tur-off timing of the lamp 23. The "turn-off timing" represents a timing at which the lamp 23 that has started to be lit is turned off. For example, any one of "when absence of paper is detected", "when power-saving mode is entered", "when turn-off button is operated", and "when specified time has passed" is selected using the radio button 121 as the turn-off timing. An input field 124 in which a specified time for the case where "when specified time has passed" is selected is provided. The administrator setting screen 120A also includes a "close" button 122 for closing the screen and a "confirm/change" button 123 for confirming or changing the setting details. "When absence of paper is detected" is a turn-off timing that may be set in the case where a paper sensor is provided. In the first exemplary embodiment, no paper sensor is provided. Therefore, "when absence of paper is detected" is not able to be set in the first exemplary embodiment. "When power-saving mode is entered" and "when specified time has passed" represent timings at which the lamp 23 is turned off, regardless of whether or not a printed material is present on the paper output tray 22.

When the administrator selects any one of the turn-off timings, the setting unit 100 stores the selected turn-off timing as the item "turn-off timing" in the turn-off timing table 111. When the administrator operates the "close" button 122, the display controller 103 displays the administrator setting screen 120B illustrated in FIG. 4B on the operation display unit 12.

The administrator setting screen 120B illustrated in FIG. 4B is a screen for setting a forced turn-off period of the lamp 23. On the administrator setting screen 120B, "do not set" or "specify period" is selected using the radio button 121. By selecting "specify period", a forced turn-off start time and a forced turn-off end time are able to be specified.

When the administrator selects "specify period" on the administrator setting screen 120B and specifies the forced turn-off start time and the forced turn-off end time, the setting unit 100 records the specified forced turn-off start time and forced turn-off end time as the items "forced turn-off start time" and "forced turn-off end time" in the turn-off timing table 111. In the case where "do not set" is selected on the administrator setting screen 120B, the setting unit 100 does not record any data in the turn-off timing table 111.

The forced turn-off period is not necessarily specified as a time period, such as from 19:00 to 06:00. For example, days of the week, dates such as the end and beginning of the year, may be specified.

(2) Operation at Time when Print Job Starts

Figure 6:
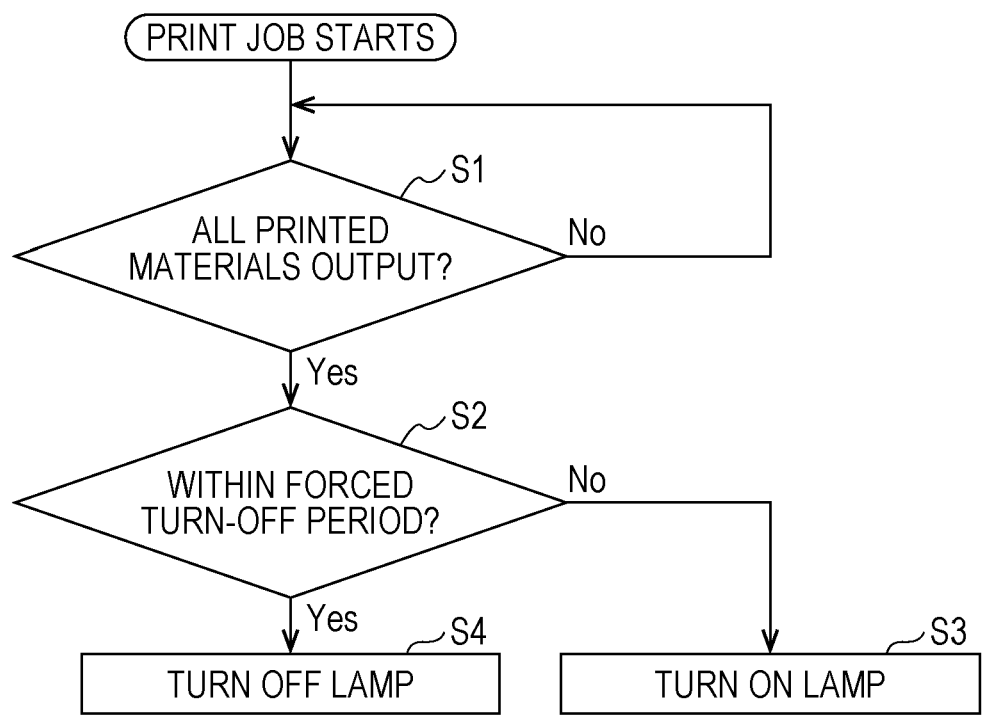
FIG. 6 is a flowchart illustrating an example of an operation of an image forming apparatus at the time when a print job starts.

Next, an example of an operation of the image forming apparatus 1 at the time when a print job starts will be explained with reference to a flowchart of FIG. 6. Hereinafter, a print job will be explained as a print job for facsimile.

The receiver 101 receives a print job for facsimile from an external apparatus via the public network 15B and the facsimile communication unit 16B.

The execution unit 102 starts to execute the print job received by the receiver 101. That is, the execution unit 102 controls the image forming unit 14 to create a printed material P by forming image data included in the print job on paper, and controls the output unit 25 to output the printed material P created by the image forming unit 14 to the paper output tray 22.

The turn-on controller 104 determines whether or not all the printed materials P have been output (S1). In the case where all the printed materials P have been output (S1: Yes), the turn-on controller 104 refers to the turn-off timing table 111 to determine whether or not the current time is within the forced turn-off period (S2). In the case where the current time is not within the forced turn-off period (S2: No), the turn-on controller 104 transmits the turn-on signal to the turn-on circuit 17 to turn on the lamp 23 (S3).

In the case where the current time is within the forced turn-off period (S2: Yes), the turn-on controller 104 transmits the turn-off signal to the turn-on circuit 17 to turn off the lamp 23 (S4).

(3) When Forced Turn-Off Period Starts

Figure 7:
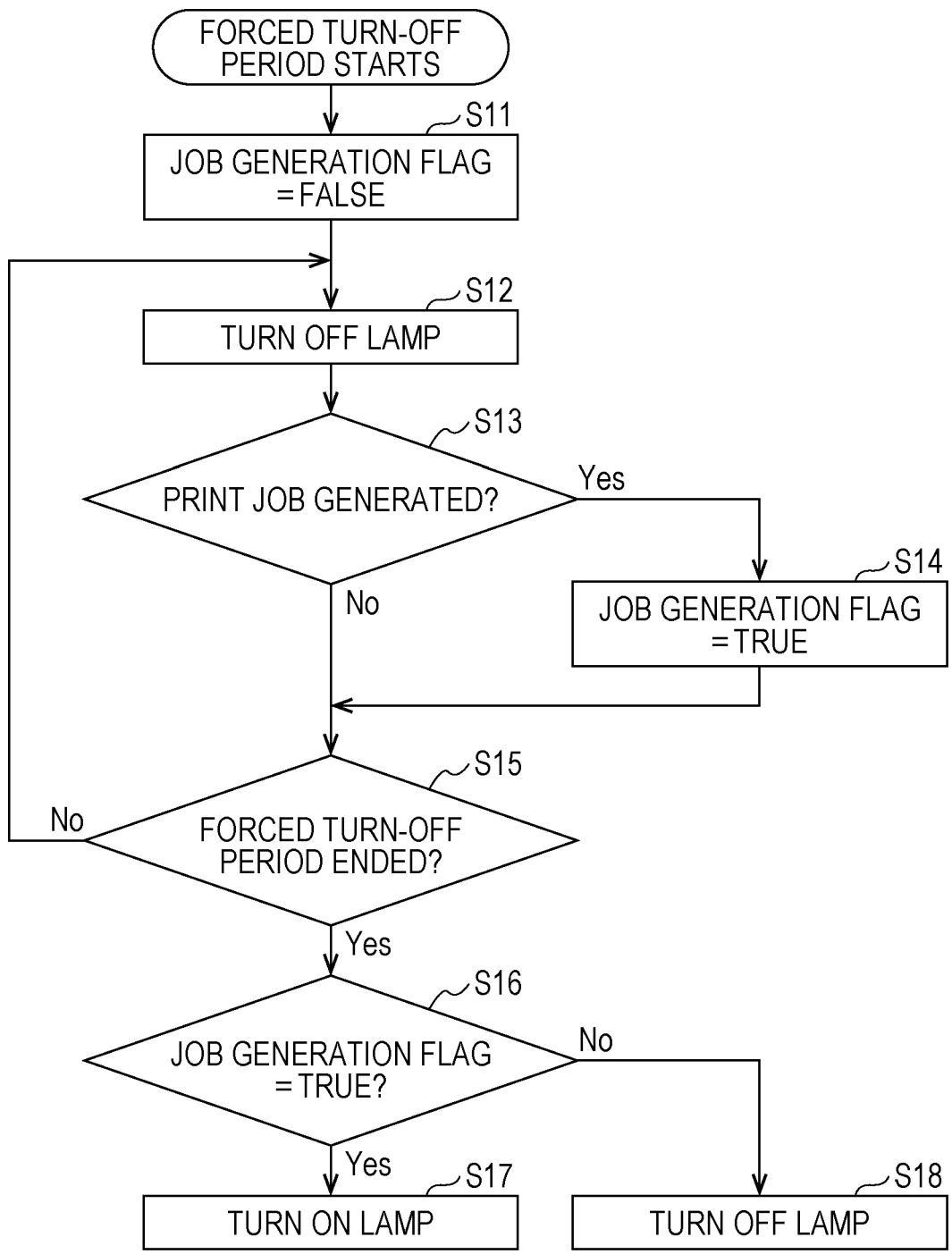
FIG. 7 is a flowchart illustrating an example of an image forming apparatus at the time when a forced turn-off period starts.

Next, an example of an operation of the image forming apparatus 1 at the time when the forced turn-off period starts will be explained with reference to a flowchart of FIG. 7.

When the forced turn-off period starts, as initialization processing, the turn-on controller 104 writes "0" as the flag data 112 (S11), and turns off the lamp 23 (S12).

Next, the execution unit 102 determines whether or not to start execution of the print job (S13). In the case where the execution unit 102 starts to execute the print job (S13: Yes), the execution unit 102 stores "1" as the flag data 112 (S14).

Next, the turn-on controller 104 determines whether or not the forced turn-off period has ended (S15). When the forced turn-off period ends (S15: Yes), the turn-on controller 104 determines whether or not the flag indicating occurrence of a job indicates TRUE, that is, whether or not the flag data 112 indicates "1" (S16).

In the case where the flag data 112 indicates "1" (S16: Yes), the turn-on controller 104 transmits the turn-on signal to the turn-on circuit 17 to turn on the lamp 23 (S17). In the case where the flag indicating occurrence of a job indicates FALSE, that is, the flag data 112 indicates "0" (S16: No), the turn-on controller 104 transmits the turn-off signal to the turn-on circuit 17 to turn off the lamp 23 (S18).

(4) Specific Operations

Next, specific operations will be explained with reference to FIGS. 5A and 5B. Hereinafter, a print job will be explained as a print job for facsimile.

(a) Case where Print Job is Generated Before Forced Turn-Off Period

Figure 5A:
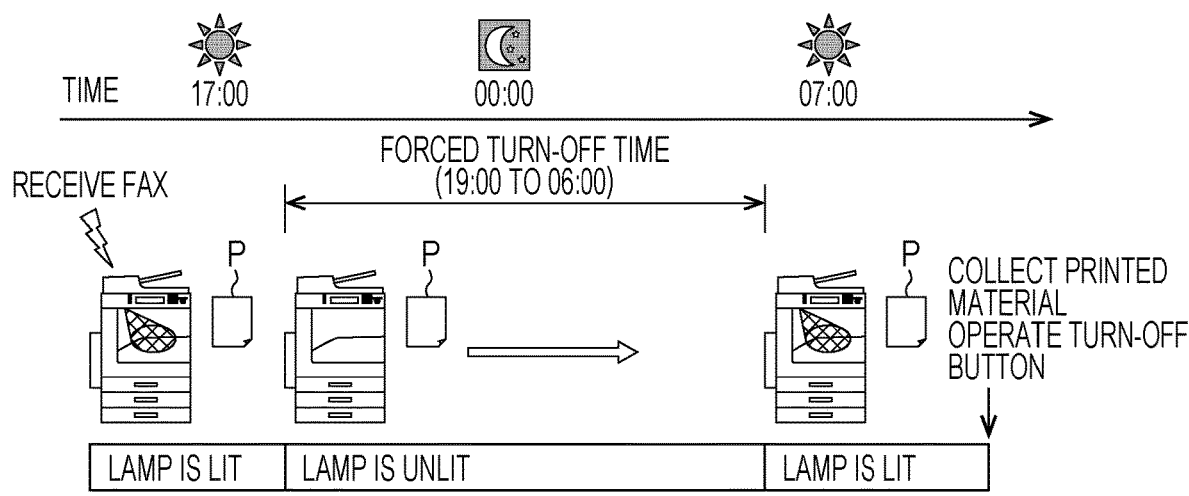
FIGS. 5A and 5B are diagrams illustrating examples of a turn-on timing of a lamp in a case where print jobs are generated at different timings.

As illustrated in FIG. 5A, for example, in the case where a print job for facsimile is generated before the forced turn-off period, when a printed material P is output, the lamp 23 is turned on (S3). In the case where the forced turn-off period starts without the printed material P being collected from the paper output tray 22 by a user, the lamp 23 is turned off (S4). When the forced turn-off period ends without the printed material P being collected from the paper output tray 22 by the user, the lamp 23 is turned on. After that, when the printed material P is collected and the turn-off button 12a is then operated, the lamp 23 is turned off. In the case where the user collects the printed material P from the paper output tray 22 before the forced turn-off period starts and then operates the turn-off button 12a, the lamp 23 is turned off.

(b) Case where Print Job is Generated During Forced Turn-Off Period

Figure 5B:
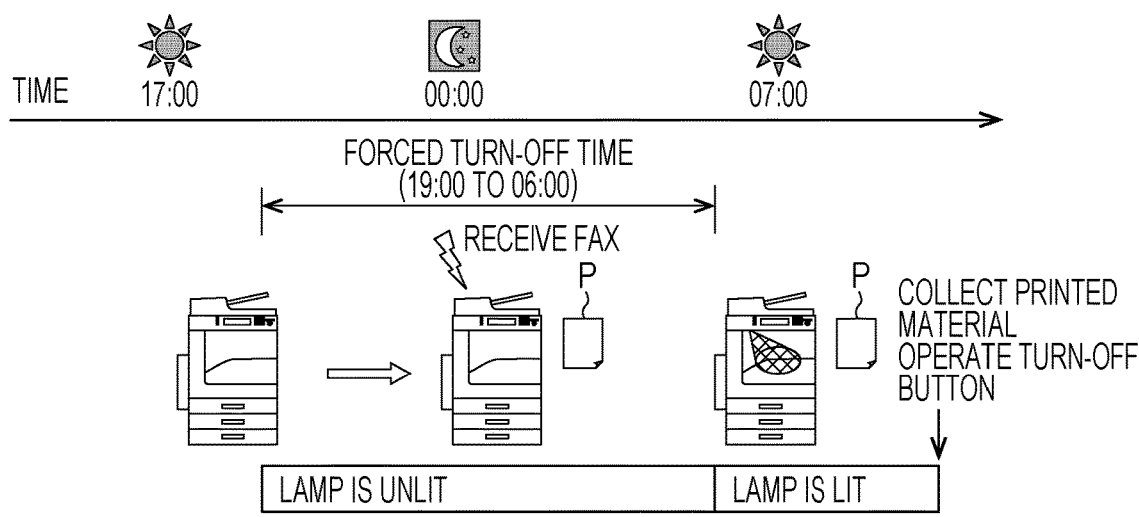

As illustrated in FIG. 5B, for example, in the case where a print job for facsimile is generated during the forced turn-off period, the lamp 23 remains unlit because the time when the printed material P is output is within the forced turn-off period (S4). When the forced turn-off period ends, the lamp 23 is turned on (S3). When the user collects the printed material P from the paper output tray 22 and operates the turn-off button 12a, the lamp 23 is turned off. In the case where the user collects the printed material P from the paper output tray 22 during the forced turn-off period and operates the turn-off button 12a, the turn-on controller 104 does not perform control for starting to cause the lamp 23 to be lit after the forced turn-off period.

As operations in the first exemplary embodiment, the case where a print job for facsimile is generated has been explained. However, the image forming apparatus 1 may operate in a similar manner in the case where a print job for printing or e-mail is generated.

Second Exemplary Embodiment

Figure 8:
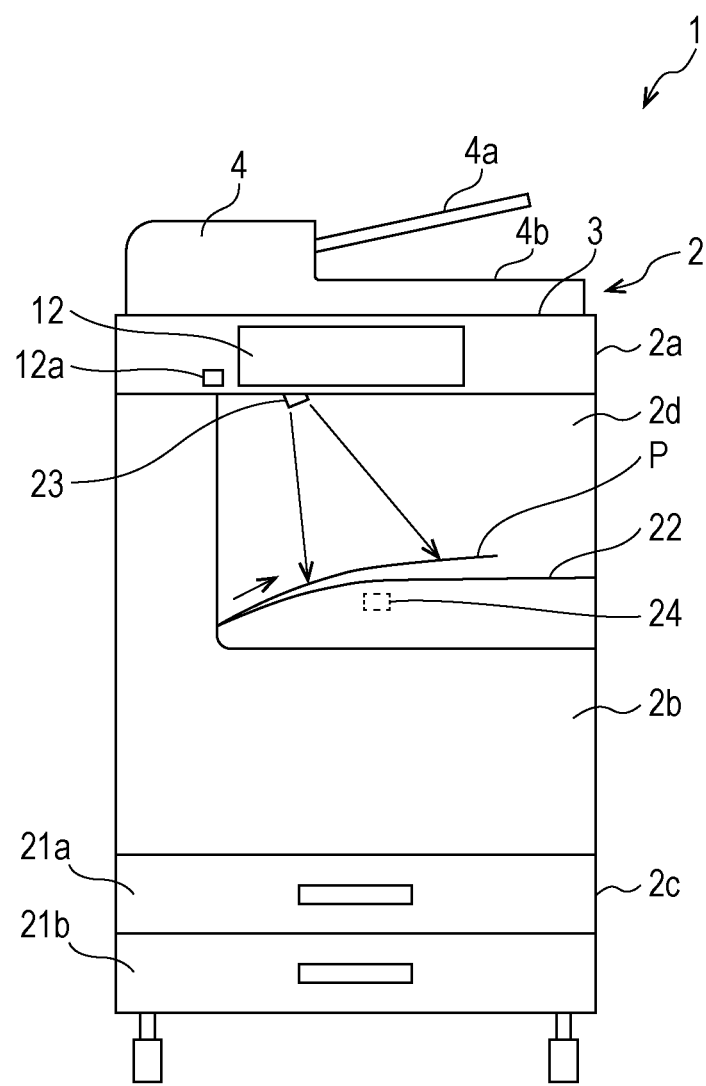
FIG. 8 is an external view illustrating a schematic configuration example of an image forming apparatus according to a second exemplary embodiment of the present disclosure.

FIG. 8 is an external view illustrating a schematic configuration example of an image forming apparatus according to a second exemplary embodiment of the present disclosure. The second exemplary embodiment is different from the first exemplary embodiment in that a paper sensor 24 that detects presence or absence of a printed material P output to the paper output tray 22 is added in place of the turn-off button 12a. Explanation for differences from the first exemplary embodiment will be focused on. The paper sensor 24 is an example of a detector.

When detecting a printed material P output to the paper output tray 22, the paper sensor 24 transmits a detection signal to the controller 10. The paper sensor 24 continuously transmits detection signals during the period in which a printed material P is present on the paper output tray 22. When all printed materials P have been picked up from the paper output tray 22, the paper sensor 24 stops transmission of detection signals.

As the paper sensor 24, for example, a reflective light emitting and receiving unit that includes a light-emitting element and a light-receiving element that are arranged in the same direction or a transmissive light emitting and receiving unit that includes a light-emitting element and a light-receiving element that is arranged correspondingly to the light-emitting element may be used.

Figure 9:
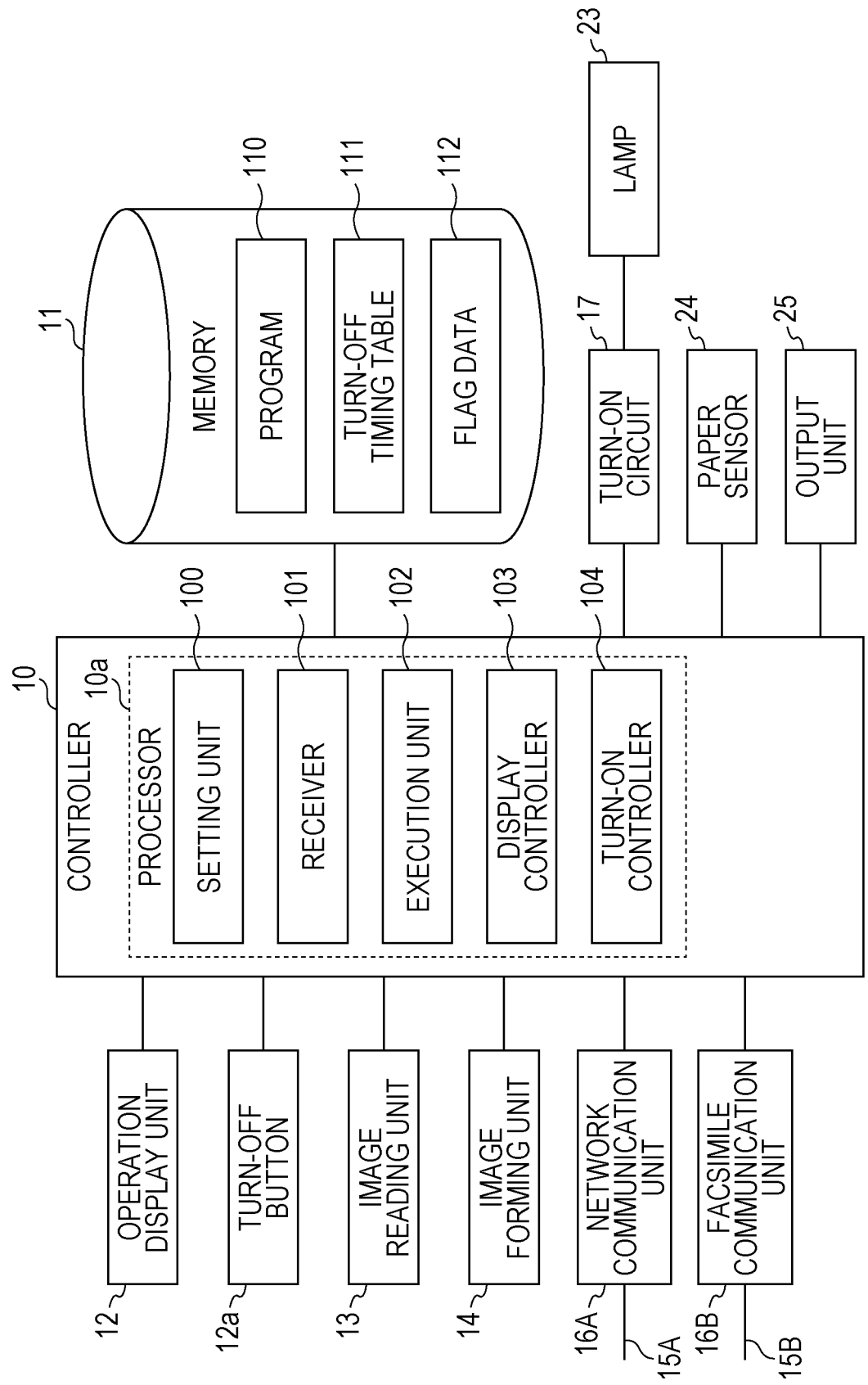
FIG. 9 is a block diagram illustrating an example of a control system of the image forming apparatus according to the second exemplary embodiment.

FIG. 9 is a block diagram illustrating an example of a control system of the image forming apparatus 1. As in the first exemplary embodiment, the image forming apparatus 1 includes the controller 10. The memory 11, the operation display unit 12, the turn-off button 12a, the image reading unit 13, the image forming unit 14, the network communication unit 16A, the facsimile communication unit 16B, and the turn-on circuit 17 are connected to the controller 10. Furthermore, the paper sensor 24 is connected to the controller 10.

As in the first exemplary embodiment, the memory 11 stores the program 110, the turn-off timing table 111 (see FIG. 3), the flag data 112, and the like.

When an output signal is transmitted from the execution unit 102, the turn-on controller 104 transmits a turn-on signal to the turn-on circuit 17. After a detection signal is transmitted from the paper sensor 24, when transmission of the detection signal stops, the turn-on controller 104 transmits a turn-off signal to the turn-on circuit 17.

Furthermore, after the turn-on controller 104 transmits the turn-on signal to the turn-on circuit 17, in the case where the forced turn-off period starts while a detection signal is transmitted from the paper sensor 24, the turn-on controller 104 transmits the turn-off signal to the turn-on circuit 17. Furthermore, after the forced turn-off period starts, even if the output signal is transmitted from the execution unit 102, the turn-on controller 104 does not transmits the turn-on signal to the turn-on circuit 17. When the forced turn-off period ends, the turn-on controller 104 transmits the turn-on signal to the turn-on circuit 17. That is, when the forced turn-off period ends, in the case where the flag data 112 indicates "1", the turn-on controller 104 transmits the turn-on signal to the turn-on circuit 17. In the case where the flag data 112 indicates "0", the turn-on controller 104 transmits the turn-off signal to the turn-on circuit 17.

Next, specific operations will be explained with reference to FIGS. 10A, and 10B. Hereinafter, a print job will be explained as a print job for facsimile.

(a) Case where Print Job is Generated Before Forced Turn-Off Period

Figure 10A:
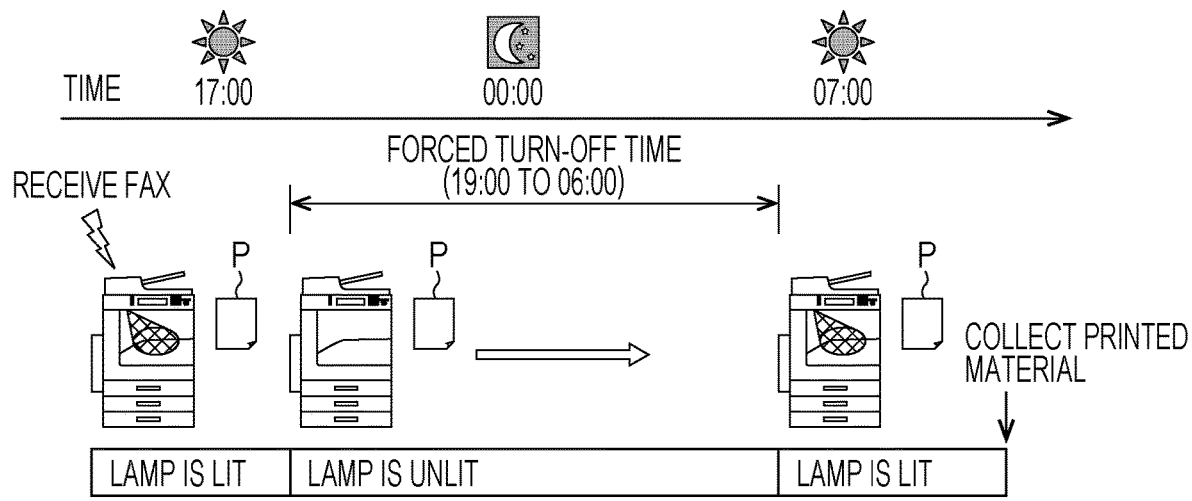
FIGS. 10A and 10B are diagrams illustrating examples of a turn-on timing of a lamp in a case where print jobs are generated at different timings.

As illustrated in FIG. 10A, for example, in the case where a print job for facsimile is generated before the forced turn-off period, when a printed material P is output, the lamp 23 is turned on (S3). In the case where the forced turn-off period starts without the printed material P being collected from the paper output tray 22 by a user, the lamp 23 is turned off (S4). When the forced turn-off period ends without the printed material P being collected from the paper output tray 22 by the user, the paper sensor 24 detects the printed material P, and the lamp 23 is turned on. After that, when the printed material P is collected and the paper sensor 24 detects that the printed material P has been collected, the lamp 23 is turned off. In the case where the user collects the printed material P from the paper output tray 22 before the forced turn-off period starts and the forced turn-off period ends, the printed material P is not detected by the paper sensor 24. Therefore, the turn-on controller 104 does not perform control for starting to cause the lamp 23 to be lit.

(b) Case where Print Job is Generated During Forced Turn-Off Period

Figure 10B:
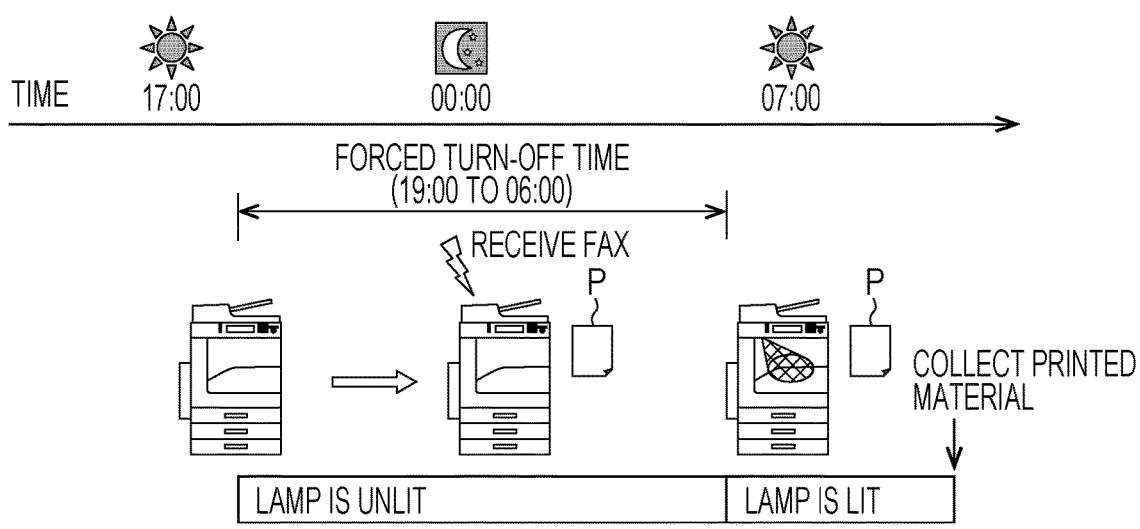

As illustrated in FIG. 10B, for example, in the case where a print job for facsimile is generated during the forced turn-off period, the lamp 23 remains unlit because the time when the printed material P is output is within the forced turn-off period (S4). When the forced turn-off period ends, the paper sensor 24 detects the printed material P, and the lamp 23 is turned on (S3). When the user collects the printed material P from the paper output tray 22 and the paper sensor 24 detects that the printed material P has been collected from the paper output tray 22, the lamp 23 is turned off. In the case where the user collects the printed material P from the paper output tray 22 within the forced turn-off period, the printed material P is not detected by the paper sensor 24 when the forced turn-off period ends. Therefore, the turn-on controller 104 does not perform control for starting to cause the lamp 23 to be lit.

As operations in the second exemplary embodiment, the case where a print job for facsimile is generated has been explained. However, the image forming apparatus 1 may operate in a similar manner in the case where a print job for printing or e-mail is generated.

First Modification

The turn-on controller 104 may perform control for causing the lamp 23 to be lit in different modes according to whether or not a printed material P is output during the forced turn-off period. The different modes include, for example:

(i) lit time of the lamp 23;
(ii) color of light emitted from the lamp 23;
(iii) state in which the lamp 23 is lit, for example, being solidly lit or flashing corresponds to a state in which the lamp 23 is lit;
(iv) amount or intensity of light emitted from the lamp 23; and
(v) timing at which the lamp 23 is turned off.

In case (i), in the case where a printed material P1 is output during the forced turn-off period, for example, the turn-on controller 104 performs control such that the lamp 23 is lit for a longer lit time than a case where a printed material P2 is output during a time outside the forced turn-off period. This is because the printed material P1 output during the forced turn-off period is not easily noticed compared to the printed material P2 output during the time outside the forced turn-off period and is highly likely to be left without being collected. In case (v), for example, even in the case where "when specified time has passed" is selected as the turn-off timing of the lamp 23 on the administrator setting screen 120A, the turn-on controller 104 may automatically set the turn-off timing of the lamp 23 indicating that the printed material P1 has been output during the forced turn-off period to "when absence of paper is detected" or "when turn-off button is operated". By setting this, in the case where the printed material P1 is left without being collected for the specified time or longer, the lit time of the lamp 23 indicating that the printed material P1 has been output is longer than the lit time of the lamp 23 indicating that the printed material P2 has been output. The administrator or the like may set a mode in which the lamp 23 is lit.

Second Modification

The image forming apparatus 1 may be shifted from a normal mode to a power-saving mode with a reduced power consumption in the case where a predetermined shift condition is satisfied. The shift condition may be, for example, that a state in which the image forming apparatus 1 is not used lasts for a predetermined time, that a predetermined time has been reached, that an instruction for entering the power-saving mode is explicitly issued by a user, or the like. In the case where a specific recovery condition is satisfied, recovery from the power-saving mode to the normal mode may occur or recovery to a partial power-saving mode in which only some units are recovered according to the recovery condition may occur. The recovery condition may be, for example, (i) when a period for execution of the power-saving mode ends; and (ii) when the image forming apparatus 1 starts to be used.

These cases may include, for example, a case where a facsimile is received, a human sensor such as a Doppler sensor or an infrared sensor, a load sensor arranged on the floor, or the like detects that a user has approached the image forming apparatus 1, a case where the operation display unit 12 is operated, a case where a document is arranged on the platen 3, and the like.

The forced turn-off period may be specified independent of the shift condition or the recovery condition. That is, even in the case where the image forming apparatus 1 receives a facsimile in the power-saving mode, recovers from the power-saving mode, and outputs a printed material P, if the time at which the printed material P is output is within the forced turn-off period, the forced turn-off period is not ended by the output of the printed material P. Furthermore, in the case where the printed material P is output during the forced turn-off period, the turn-on controller 104 may perform control for starting to cause the lamp 23 to be lit when the forced turn-off period ends even in the case where the power-saving mode or the partial power-saving mode has been entered.

Exemplary embodiments of the present disclosure have been described above. However, the exemplary embodiments are not limited to the exemplary embodiments described above. Various changes and implementations may be made without departing from the scope of the present disclosure.

Part of or the entire components of the processor 10a may be configured as a hardware circuit such as a field programmable gate array (FPGA), an application specific integrated circuit (ASIC), or the like.

Furthermore, part of components in the exemplary embodiments described above may be omitted or changed without departing from the scope of the present disclosure. In the flow of processes in the exemplary embodiments of the present disclosure, addition, deletion, change, exchange, and the like of steps may be performed without departing from the scope of the present disclosure. Programs used in the exemplary embodiments may be recorded in a computer-readable recording medium such as a compact disc-read only memory (CD-ROM) and provided. The programs may be stored in an external server such as a cloud server and used via a network.

In the embodiments above, the term "processor" refers to hardware in a broad sense. Examples of the processor includes general processors (e.g., CPU: Central Processing Unit), dedicated processors (e.g., GPU: Graphics Processing Unit, ASIC: Application Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An image forming apparatus comprising:
    an image forming unit that creates a printed material by forming an image on paper;
    an output unit that outputs the printed material to an output tray;
    a light source that is provided such that lit light is viewable from outside the image forming apparatus; and
    a processor configured to
        receive specification of a period during which the light source is not to be lit,
        receive an instruction to create the printed material, and
        perform control such that in a case where the printed material is output in accordance with the instruction at a time outside the period, the light source is lit, whereas in a case where the printed material is output during the period, the light source is not lit during the period and then starts to be lit when the period ends.

2. The image forming apparatus according to claim 1, wherein in a case where the printed material is output during the period and, after that, an operation indicating that the printed material has been picked up from the output tray is performed, the processor does not perform control for starting to cause the light source to be lit when the period ends.

3. The image forming apparatus according to claim 2, wherein in a case where the operation is performed during the period, the processor does not perform control for starting to cause the light source to be lit when the period ends, whereas in a case where the operation is performed after the period ends and the light source starts to be lit, the processor performs control for turning off the lit light source.

4. The image forming apparatus according to claim 3, wherein the processor performs control for causing the light source to be lit in different modes according to whether or not the printed material is output during the period.

5. The image forming apparatus according to claim 4, wherein one of the modes is a lit time of the light source, and wherein in a case where the printed material is output during the period, the processor performs control for causing the light source to be lit for a longer lit time than a case where the printed material is output at a time outside the period.

6. The image forming apparatus according to claim 2, further comprising:

a detector that detects presence or absence of the printed material output to the output tray, wherein in a case where the printed material is output during the period and the printed material is not detected by the detector when the period ends because the operation has been performed, the processor does not perform control for starting to cause the light source to be lit when the period ends.

7. The image forming apparatus according to claim 6, wherein the processor performs control for causing the light source to be lit in different modes according to whether or not the printed material is output during the period.

8. The image forming apparatus according to claim 2, wherein the processor performs control for causing the light source to be lit in different modes according to whether or not the printed material is output during the period.

9. The image forming apparatus according to claim 8, wherein one of the modes is a lit time of the light source, and wherein in a case where the printed material is output during the period, the processor performs control for causing the light source to be lit for a longer lit time than a case where the printed material is output at a time outside the period.

10. The image forming apparatus according to claim 9, wherein the longer lit time is a time up to execution of the operation.

11. The image forming apparatus according to claim 1, wherein the processor performs control for causing the light source to be lit in different modes according to whether or not the printed material is output during the period.

12. The image forming apparatus according to claim 11, wherein one of the modes is a lit time of the light source, and wherein in a case where the printed material is output during the period, the processor performs control for causing the light source to be lit for a longer lit time than a case where the printed material is output at a time outside the period.

13. The image forming apparatus according to claim 12, wherein the longer lit time is a time up to execution of the operation.

14. The image forming apparatus according to claim 13, wherein in a case where the printed material is output during the period, the processor performs control for starting to cause the light source to be lit when the period ends even in a case where a power-saving mode has been entered.

15. The image forming apparatus according to claim 13, wherein in a case where the printed material is output during the period, if the image forming apparatus is in a power-saving mode when the period ends, the processor performs control for starting to cause the light source to be lit when recovery from the power-saving mode occurs.

16. The image forming apparatus according to claim 12, wherein in a case where the printed material is output during the period, the processor performs control for starting to cause the light source to be lit when the period ends even in a case where a power-saving mode has been entered.

17. The image forming apparatus according to claim 12, wherein in a case where the printed material is output during the period, if the image forming apparatus is in a power-saving mode when the period ends, the processor performs control for starting to cause the light source to be lit when recovery from the power-saving mode occurs.

18. The image forming apparatus according to claim 11, wherein in a case where the printed material is output during the period, the processor performs control for starting to cause the light source to be lit when the period ends even in a case where a power-saving mode has been entered.

19. The image forming apparatus according to claim 11, wherein in a case where the printed material is output during the period, if the image forming apparatus is in a power-saving mode when the period ends, the processor performs control for starting to cause the light source to be lit when recovery from the power-saving mode occurs.

20. A non-transitory computer readable medium storing a program causing a computer to execute a process for image formation, the process comprising:

creating a printed material by forming an image on paper;

outputting the printed material to an output tray;

causing lit light to be viewable from outside an image forming apparatus; and receiving specification of a period during which a light source is not to be lit, receiving an instruction to create the printed material, and performing control such that in a case where the printed material is output in accordance with the instruction at a time outside the period, the light source is lit, whereas in a case where the printed material is output during the period, the light source is not lit during the period and then starts to be lit when the period ends.

* * * * *